United States Patent

[11] 3,590,953

| [72] | Inventor | John C. Wellauer<br>Peoria, Ill. |
|---|---|---|
| [21] | Appl. No. | 811,975 |
| [22] | Filed | Apr. 1, 1969 |
| [45] | Patented | July 6, 1971 |
| [73] | Assignee | Caterpillar Tractor Co.<br>Peoria, Ill. |

[54] ENGINE OIL PAN
6 Claims, 2 Drawing Figs.

[52] U.S. Cl. .................................................. 184/6 B,
184/6 I, 184/106
[51] Int. Cl. .................................................. F01m 11/06
[50] Field of Search .................................. 184/6, 6 B, 6 I,
106; 123/196; 137/437, 492

[56] References Cited
UNITED STATES PATENTS

| 2,373,360 | 4/1945 | Walsh............................ | 184/6 |
| 2,402,065 | 6/1946 | Martin........................... | 184/6 B |
| 2,874,804 | 2/1959 | Haas.............................. | 184/6 B |

FOREIGN PATENTS

| 873,776 | 4/1953 | Germany...................... | 184/6 I |
| 705,683 | 3/1954 | Great Britain................ | 184/6 |

*Primary Examiner*—Manuel A. Antonakas
*Attorney*—Fryer, Tjensvold, Feix, Phillips & Lempio

ABSTRACT: An engine oil pan in which oil is scavenged from the pan at selected positions and delivered to a compartment within the pan, from which it is pumped to the machinery which is to be lubricated.

PATENTED JUL 6 1971

3,590,953

INVENTOR
JOHN C. WELLAUER

BY
Fryer, Zinnwald, Fix, Phillips + Lempio
ATTORNEYS

ENGINE OIL PAN

BACKGROUND AND SUMMARY OF THE INVENTION

This invention relates to engine oil pans, and more particularly to a pan having an enclosed compartment which receives scavenged oil from parts of the pan outside of the enclosed compartment.

Oil pans are usually designed to provide a supply of lubricant to an engine, to which the pan is attached, by means of a circulating pump. In some applications, it is necessary to design the engine for operating in a wide variety of angular positions (tilt angles). The tilt angles must be considered so that an oil pan can be designed which will negate the problems caused by tilting. Some of these problems include pump starvation, caused by the pump suction bell not being immersed in the oil when the engine is tilted; crank seal leakage, caused by the seals being immersed in oil when the engine is tilted; and an increase in engine friction caused by the connecting rods splashing in the oil.

In many designs, these problems have been solved by: using smaller oil supplies and requiring a shorter period between oil changes; reducing the maximum allowable tilt angles; or utilizing a deeper or wider pan design with appropriate baffles. Although the first two solutions produce obvious disadvantages, it has been found that the third solution often is in conflict with a limitation on the maximum size of the oil pan for a given engine. This conflict is often impossible to resolve when it is necessary to utilize the engine in a mounting position having only a limited space for the oil pan.

The oil pan of this invention utilizes an enclosed compartment to which oil, draining from the engine to the oil pan, is delivered by a scavenging pump connected to intake passages at selected positions in the pan. The scavenging pump is designed to have a greater capacity than the oil-circulating pump to ensure an adequate supply of oil at all times to the circulating pump suction bell. This bell is located within the enclosed compartment.

Since the scavenging passages pick up oil draining from the engine as soon as it reaches the intakes, and then delivers it to the enclosed compartment, the engine utilizing the pan of this invention can be exposed to severe tilt angles without submerging the crankshaft seals in oil. The use of the scavenge pump to deliver oil to the enclosed compartment results in an oil supply which is not dependent upon gravity flow and is not effected by sudden changes in tilt angle.

Therefore it is an object of this invention to provide an engine oil pan which is simple and inexpensive to manufacture.

It is also an object of this invention to provide such an oil pan which may be utilized in a limited area.

It is also an object hereof to provide such an oil pan which may be utilized on an engine which is subjected to severe tilt angles.

Other objects and advantages of the present invention will become apparent from the following description and claims as illustrated in the accompanying drawing which, by way of illustration, shows a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

DETAILED DESCRIPTION

Figure 1:
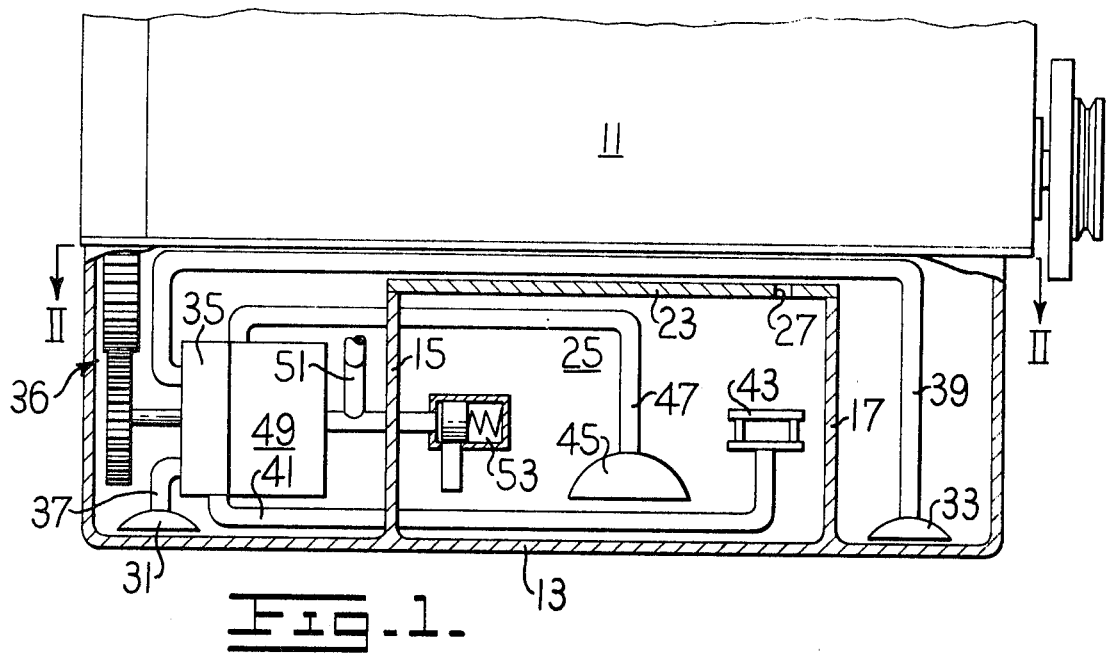
FIG. 1 is a side elevation, partly in section, of the oil pan of the present invention, schematically illustrating the oil-scavenging system thereof.
Figure 2:
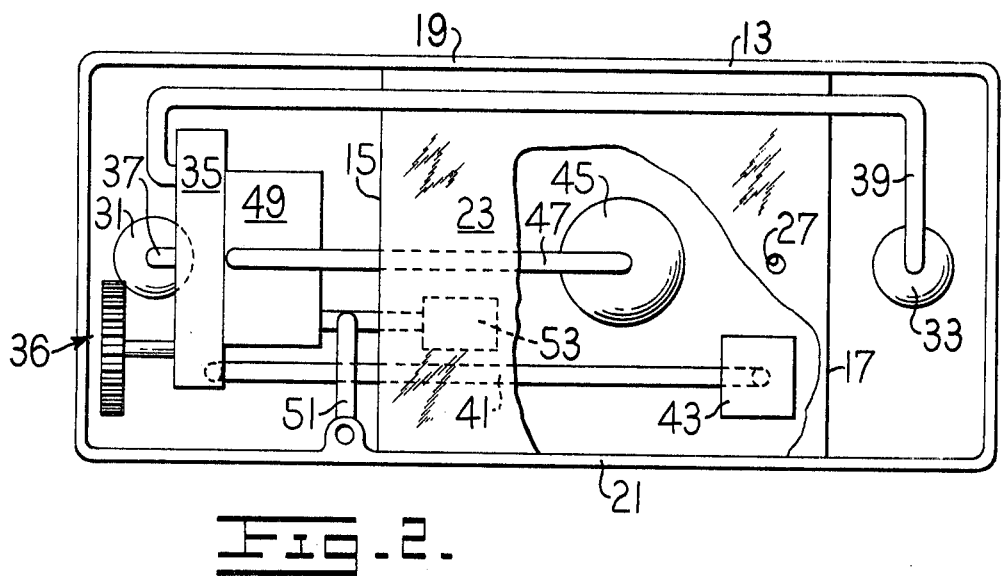
FIG. 2 is a top plan view of the system shown in FIG. 1.

In the drawing, there is shown an engine 11 to which an oil pan z3 is suitably fastened in a well-known manner. The pan 13 has two partitions 15 and 17 which extend transversely from a wall 19 to a wall 21 of the pan. An upper plate or cover 23 is secured to the upper edges of the partitions 15 and 17, extending from wall 19 to wall 21. Thus, the partitions 15 and 17, the walls 19 and 21, and the plate 23 form an enclosed compartment 25 which is opened to the oil pan only through a vent hole 27 within the plate 23, which vent hole provides proper ventilation of the compartment.

Oil-scavenging bells 31 and 33 are suitably situated at preselected positions within the pan 13, the positions illustrated as being at the rear and the front of the pan respectively. The scavenging bells communicate with a scavenging pump 35, driven through gear train 36, by means of passages 37 and 39 respectively. If desired, the passages 37 and/or 39 may be integral with the pan 13 and the compartment structure simplified accordingly.

An outlet passage 41 from the pump 35 communicates with and delivers oil to the compartment 25 at a diffusor oil plate 43 which prevents splashing of the oil as it enters the compartment. The diffusor may be a parallel plate diffusor with the oil entering from the bottom and splashing against the upper plate before running off.

A suction bell 45 within the compartment 25 communicates, via a passage 47, with a circulating pump 49, also driven by gear train 36, to bring oil to the pump for delivery to the engine 11 through a passage 51, which also communicates with a pressure relief valve 53. The relief valve, when actuated, returns the oil to the compartment 25.

Thus the applicant has disclosed an embodiment of an improved engine oil pan in which hardware has been situated for scavenging the extremities of the pan and delivering the scavenged oil to an enclosed compartment for delivery to the main lubrication system. Since pump 35 is of greater capacity than pump 49, only a minimal amount of oil will remain within pan 13 at either end thereof, thereby obviating the possibility of the oil reaching the crank seals, while allowing the engine to be operated at extreme tilt angles with adequate oil sump capacity. Although many alterations and modifications of the embodiment illustrated and described will be obvious to those skilled in the art, such alterations and modifications may be made without exceeding the purview of the following claims.

I claim:

1. An engine oil pan having an enclosed compartment therein, first scavenging means including a pump drawing oil from the pan outside the compartment and delivering it to the compartment through a diffusor, a pressure relief valve means located entirely within said compartment including means communicating said pressure relief valve means with the pump of said first scavenging means so that pressure fluid in said pump is relieved directly into said compartment when as overpressure condition occurs, said pressure relief valve means being directly actuated by pressure, and second scavenging means including a pump drawing oil from within the compartment for delivery to an engine lubrication system.

2. The engine oil pan of claim 1 wherein said first scavenging means includes at least one scavenging head located in the pan and outside the compartment and said second scavenging means includes at least one scavenging head within the compartment.

3. The engine oil pan of claim 1 wherein said transverse partitions are free of openings and said cover has a single opening therein in the form of a single vent hole.

4. The engine oil pan of claim 1 wherein said valve means comprises a valve and wherein said diffuser is a parallel plate diffusor comprising a pair of spaced parallel plates in the compartment.

5. An engine oil pan having an enclosed compartment therein, said compartment being defined by said oil pan and a pair of spaced, transverse partitions and an upper cover secured to the upper edges of the partitions and extending from wall to wall of the pan, first scavenging means including a pump drawing oil from the pan outside the compartment and delivering it to the compartment through a parallel plate diffusor comprising a pair of spaced parallel plates in the compartment, second scavenging means including a pump drawing oil from within the compartment whereby oil may be delivered to an engine lubrication system, and wherein said scavenging means includes scavenging heads located at the extremities of the oil pan.

6. The engine oil pan of claim 5 wherein said partitions are free from openings and said cover has a single vent hole therein.